(12) United States Patent
Xu

(10) Patent No.: US 12,326,967 B2
(45) Date of Patent: Jun. 10, 2025

(54) HANDLE CALIBRATION METHOD, HANDLE, HEAD-MOUNTED DISPLAY AND STORAGE MEDIUM

(71) Applicant: GOERTEK INC., Shandong (CN)

(72) Inventor: Xuxiao Xu, Shandong (CN)

(73) Assignee: GOERTEK INC., Shandong (CN)

( * ) Notice: Subject to any disclaimer, the term of this patent is extended or adjusted under 35 U.S.C. 154(b) by 0 days.

(21) Appl. No.: 18/555,241

(22) PCT Filed: Dec. 16, 2021

(86) PCT No.: PCT/CN2021/138667
§ 371 (c)(1),
(2) Date: Oct. 12, 2023

(87) PCT Pub. No.: WO2022/217958
PCT Pub. Date: Oct. 20, 2022

(65) Prior Publication Data
US 2024/0192767 A1 Jun. 13, 2024

(30) Foreign Application Priority Data
Apr. 15, 2021 (CN) .......................... 202110409714.8

(51) Int. Cl.
*G06F 3/01* (2006.01)
*A63F 13/22* (2014.01)
(Continued)

(52) U.S. Cl.
CPC ............ *G06F 3/011* (2013.01); *G02B 27/017* (2013.01); *A63F 13/22* (2014.09); *A63F 13/24* (2014.09);
(Continued)

(58) Field of Classification Search
CPC ...... G06F 3/011; G06F 3/01; G06F 2203/012; G02B 27/017; A63F 13/22; A63F 13/24; A63F 13/92; A63F 2300/8082
See application file for complete search history.

(56) References Cited

U.S. PATENT DOCUMENTS 9,833,700 B2 * 12/2017 Higgins .................. A63F 13/24
10,198,874 B2 * 2/2019 Dearman ............. G02B 27/017
(Continued)

FOREIGN PATENT DOCUMENTS

CN 106123916 A 11/2016
CN 106768361 A 5/2017
(Continued)

*Primary Examiner* — Douglas M Wilson
(74) *Attorney, Agent, or Firm* — LKGlobal | Lorenz & Kopf, LLP

(57) ABSTRACT

A handle calibration method, a handle, a head-mounted display and a storage medium are disclosed. The handle calibration method is applied to at least two handles belonging to a same virtual reality system. The method comprises the steps of: generating a calibration signal when the at least two handles maintain a target relative position; and sending the calibration signal to the head-mounted display, so that when the at least two handles maintain the target relative position, the head-mounted display calibrates a current relative displaying position of the at least two handles in the head-mounted display to a target relative displaying position corresponding to the target relative position.

15 Claims, 3 Drawing Sheets

(51) Int. Cl.
  *A63F 13/24* (2014.01)
  *G02B 27/01* (2006.01)
  *A63F 13/92* (2014.01)

(52) U.S. Cl.
  CPC ....... *A63F 13/92* (2014.09); *A63F 2300/8082* (2013.01); *G06F 3/01* (2013.01); *G06F 2203/012* (2013.01)

(56) References Cited

U.S. PATENT DOCUMENTS

| | | | | |
|---|---|---|---|---|
| 10,701,431 | B2* | 6/2020 | DiVerdi | ........... H04N 21/41265 |
| 10,905,946 | B2* | 2/2021 | Nietfeld | ................. A63F 13/42 |
| 10,996,742 | B2* | 5/2021 | Connellan | ................ G01S 5/30 |
| 11,724,177 | B2* | 8/2023 | Huang | ................. G06F 3/0346 463/37 |
| 11,806,609 | B2* | 11/2023 | Nietfeld | ................. G06F 3/014 |
| 2018/0329517 | A1* | 11/2018 | Steedly | ................. A63F 13/211 |
| 2018/0373318 | A1* | 12/2018 | Yang | ....................... G06F 3/012 |
| 2020/0241632 | A1 | 7/2020 | Lyer et al. | |
| 2020/0345553 | A1 | 11/2020 | Baudisch et al. | |
| 2020/0346105 | A1* | 11/2020 | Huang | ................. G06F 3/0346 |

FOREIGN PATENT DOCUMENTS

| | | | | |
|---|---|---|---|---|
| CN | 107168515 | A | | 9/2017 |
| CN | 107390173 | A | | 11/2017 |
| CN | 109240483 | A | | 1/2019 |
| CN | 109613983 | A | | 4/2019 |
| CN | 109633632 | A | | 4/2019 |
| CN | 209627381 | U | | 11/2019 |
| CN | 110780738 | A | | 2/2020 |
| CN | 210091408 | U | | 2/2020 |
| CN | 112214106 | A | | 1/2021 |
| CN | 113138666 | A | | 7/2021 |
| CN | 111176445 | B | * | 7/2023 ............. G06F 3/011 |

* cited by examiner

HANDLE CALIBRATION METHOD, HANDLE, HEAD-MOUNTED DISPLAY AND STORAGE MEDIUM

CROSS-REFERENCE TO RELATED APPLICATIONS

This application is a U.S. National-Stage entry under 35 U.S.C. § 371 based on International Application No. PCT/CN2021/138667, filed Dec. 16, 2021 which was published under PCT Article 21(2) and which claims priority to Chinese Application No. 202110409714.8, filed Apr. 15, 2021, which are all hereby incorporated herein in their entirety by reference.

TECHNICAL FIELD

This application pertains to the technical field of virtual reality, and in particular to a handle calibration method, a handle, a head-mounted display and a storage medium.

BACKGROUND

VR (virtual reality) product is a type of entertainment product that is popular currently. It realizes various experiences in the virtual world through the handle. During the normal turning-on and use of handles of the VR product, the HMD (head-mounted display) will display the position of the handle on the display interface. Since the handle will inevitably drift during use, in order to improve the user experience, it is necessary to calibrate the position of the handle on the display interface.

At present, methods such as optical positioning or electromagnetic positioning are often used for calibration. However, after calibrated by the conventional calibration methods, there is still an error between the relative position among the handles and the relative displaying position among the handles on the display interface.

Therefore, there is an urgent need for a solution that can calibrate the relative displaying position among the handles.

The above content is only used to assist the understanding of the technical solutions of the present disclosure, and does not mean that the above content is acknowledged as the prior art. In addition, other objects, desirable features and characteristics will become apparent from the subsequent summary and detailed description, and the appended claims, taken in conjunction with the accompanying drawings and this background.

SUMMARY

The main object of the present disclosure is to provide a handle calibration method, a handle, a head-mounted display and a storage medium, so as to solve the technical problem that the conventional handle calibration methods cannot accurately calibrate the relative displaying position among the handles.

In order to achieve the above object, an embodiment of the present disclosure provides a handle calibration method, wherein it is applied to at least two handles belonging to a same virtual reality system, the virtual reality system also comprises a head-mounted display, and the method comprises the steps of:

generating a calibration signal when the at least two handles maintain a target relative position; and
sending the calibration signal to the head-mounted display, so that when the at least two handles maintain the target relative position, the head-mounted display calibrates a current relative displaying position of the at least two handles in the head-mounted display to a target relative displaying position corresponding to the target relative position.

Optionally, the at least two handles comprise a first handle and a second handle, and the target relative position is that the first handle and the second handle are in a state of being side by side:

the step of generating a calibration signal when the at least two handles maintain the target relative position specifically comprises:
generating a calibration signal when the first handle and the second handle keep the state of being side by side.

Optionally, a first trigger circuit is provided in the first handle, and a second trigger circuit is provided in the second handle:

the step of generating a calibration signal when the first handle and the second handle keep the state of being side by side specifically comprises:
generating a calibration signal based on the first trigger circuit and the second trigger circuit when the first handle and the second handle keep the state of being side by side.

Optionally, N number of first trigger points connected to the first trigger circuit are provided on the first handle, and N number of second trigger points connected to the second trigger circuit are provided on the second handle, and N is a positive integer:

the step of generating a calibration signal based on the first trigger circuit and the second trigger circuit when the first handle and the second handle keep the state of being side by side comprises:
when the first handle and the second handle keep the state of being side by side, connecting the N number of first trigger points with the N number of second trigger points correspondingly to trigger the first trigger circuit and the second trigger circuit and generate the calibration signal.

Optionally, the first trigger circuit comprises a first processor electrically connected to two first trigger points, and one of the two first trigger points is set to high level, and the other of the two first trigger points is set to low level;

the second trigger circuit comprises a second processor electrically connected to two second trigger points, and one of the two second trigger points that is corresponding to the first trigger point set to high level is set to low level, and the other of the two second trigger points is set to high level;

the step of when the first handle and the second handle keep the state of being side by side, connecting the N number of first trigger points with the N number of second trigger points correspondingly to trigger the first trigger circuit and the second trigger circuit and generate the calibration signal specifically comprises:
when the first handle and the second handle keep the state of being side by side, connecting the first trigger point set to high level with the second trigger point set to low level, and connecting the first trigger point set to low level with the second trigger point set to high level, so that both the first processor and the second processor receive electrical signals and generate the calibration signal according to the electrical signal.

Optionally, the first trigger point set to high level is a first concave structure, and the second trigger point set to low level is a second convex structure engaged with the first concave structure:

the second trigger point set to high level is a second concave structure, and the first trigger point set to low level is a first convex structure engaged with the second concave structure;

wherein, when the first handle and the second handle keep the state of being side by side, the first convex structure is embedded in the second concave structure, and the second convex structure is embedded in the first concave structure, so that the first trigger point set to high level is connected to the second trigger point set to low level, and the first trigger point set to low level is connected to the second trigger point set to high level.

In addition, in order to achieve the above object, an embodiment of the present disclosure also provides a handle calibration method, wherein it is applied to a head-mounted display in a virtual reality system, the virtual reality system also comprises at least two handles, and the method comprises:

receiving a calibration signal sent by the handles, wherein the calibration signal is generated when the at least two handles maintain a target relative position; and when the at least two handles maintain the target relative position, based on the calibration signal, calibrating a current relative displaying position of the at least two handles to a target relative displaying position corresponding to the target relative position.

In addition, in order to achieve the above object, an embodiment of the present disclosure also provides a handle calibration apparatus, wherein it is applied to at least two handles belonging to a same virtual reality system, the virtual reality system also comprises a head-mounted display, and the apparatus comprises:

a signal generation module for generating a calibration signal when the at least two handles maintain a target relative position; and a signal sending module for sending the calibration signal to the head-mounted display, so that when the at least two handles maintain the target relative position, the head-mounted display calibrates a current relative displaying position of the at least two handles in the head-mounted display to a target relative displaying position corresponding to the target relative position.

In addition, in order to achieve the above object, an embodiment of the present disclosure also provides a handle calibration apparatus, wherein it is applied to a head-mounted display in a virtual reality system, the virtual reality system also comprises at least two handles, and the apparatus comprises:

a signal receiving module for receiving a calibration signal sent by the handles, wherein the calibration signal is generated when the at least two handles maintain a target relative position; and a position calibration module for, when the at least two handles maintain the target relative position, based on the calibration signal, calibrating a current relative displaying position of the at least two handles to a target relative displaying position corresponding to the target relative position.

In addition, in order to achieve the above object, an embodiment of the present disclosure also proposes a handle comprising: a memory, a processor, and a computer program that is stored on the memory, operable on the processor, and configured to implement the steps of the above method.

In addition, in order to achieve the above object, an embodiment of the present disclosure also proposes a head-mounted display comprising: a memory, a processor, and a computer program that is stored on the memory, operable on the processor, and configured to implement the steps of the above methods.

In addition, in order to achieve the above object, an embodiment of the present disclosure also proposes a virtual reality system comprising the above handle and the above head-mounted display:

In addition, in order to achieve the above object, an embodiment of the present disclosure also provide a storage medium having a computer program stored thereon, and when the computer program is executed by a processor, the steps of the above method are implemented.

The beneficial effects that the present disclosure can realize are as follows.

A handle calibration method, a handle, a head-mounted display, and a storage medium are proposed in the embodiments of the present disclosure. The handle calibration method is applied to at least two handles belonging to the same virtual reality system. The method comprises: at least two handles When the target relative position is maintained, a calibration signal is generated; and the calibration signal is sent to the head-mounted display, so that the head-mounted display will at least two handles maintain the target relative position. The current relative displaying position among the handles in the head-mounted display are calibrated to the target relative displaying positions corresponding to the target relative positions. It can be seen that since the real target relative position maintained among the handles is used to calibrate the relative displaying position among the handles in the display interface of the head-mounted display, compared with the conventional calibration with respect to a single handle by using methods such as optical positioning or electromagnetic positioning, it can solve the technical problem that the conventional handle calibration methods cannot accurately calibrate the relative displaying position among the handles, thereby achieving the technical effect of improving the accuracy of the relative displaying position among the handles.

BRIEF DESCRIPTION OF DRAWINGS

The present invention will hereinafter be described in conjunction with the following drawing figures, wherein like numerals denote like elements, and.

Figure 1:
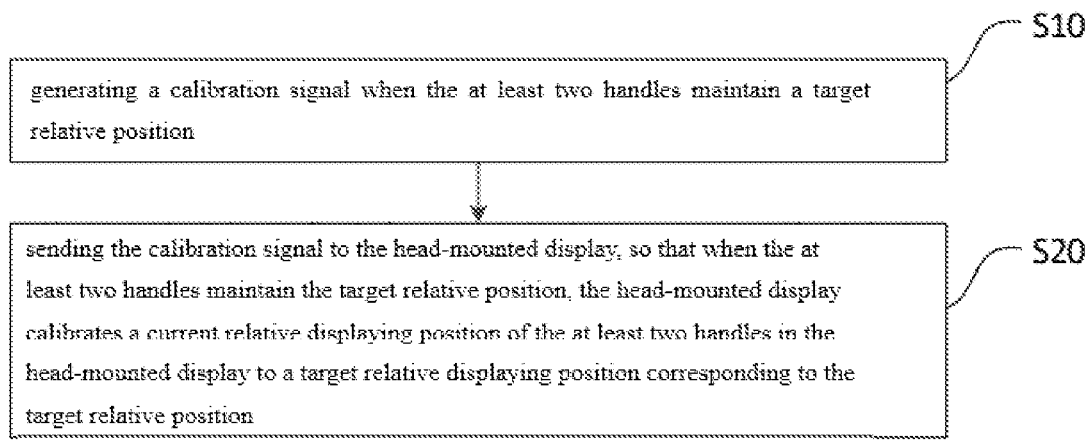
FIG. 1 is a schematic flow chart of a handle calibration method in an embodiment of the present disclosure.

The realization of object, functional features and advantages of the present disclosure will be further described in combination with the embodiments and with reference to the accompanying drawings.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

It should be understood that the specific embodiments described here are only used to explain the present disclosure, not to limit the present disclosure.

Based on the embodiments of the present disclosure, any other embodiment obtained by a person of ordinary skill in the art without paying any creative effort shall fall within the protection scope of the present disclosure.

It should be noted that, in the present disclosure, the terms "first" and "second" are used for descriptive purposes only and are not to be construed as indicating or implying relative importance or implicitly indicating the number of indicated technical features. In addition, the technical solutions in various embodiments of the present disclosure can be combined with each other if their combination is realizable to a person of ordinary skill in the art. When the combination of technical solutions is contradictory or cannot be realized, it should be considered that such a combination of technical solutions does not exist and is not within the scope of protection claimed in the present disclosure.

The main solution of the embodiment of the present disclosure is: generating a calibration signal when the at least two handles maintain a target relative position; and sending the calibration signal to the head-mounted display, so that when the at least two handles maintain the target relative position, the head-mounted display calibrates a current relative displaying position of the at least two handles in the head-mounted display to a target relative displaying position corresponding to the target relative position.

In the prior art, the calibration is performed using methods such as optical positioning or electromagnetic positioning. The position calibration is performed with respect to a single handle, so after calibration, there will still be an error between the relative position among the handles and the relative displaying position among the handles on the display interface. Therefore, the conventional handle calibration methods cannot accurately calibrate the relative displaying positions between the handles, thereby resulting in poor calibration effect.

The present disclosure provides a solution to calibrate the relative displaying position among the handles in the display interface of the head-mounted display by using the real target relative position maintained among the handles. Compare with the prior art in which the calibration is performed with respect to a single handle by using methods such as optical positioning or electromagnetic positioning, the solution of the present disclosure can solve the technical problem that the conventional handle calibration methods cannot accurately calibrate the relative displaying position among the handles, thereby achieving the technical effect of improving the accuracy of the relative displaying position among the handles.

First Embodiment

Referring to FIG. 1, an embodiment of the present disclosure provides a handle calibration method. The method of this embodiment is applied to at least two handles belonging to a same virtual reality system, the virtual reality system also comprises a head-mounted display, and the method comprises the steps of:

generating a calibration signal when the at least two handles maintain a target relative position; and sending the calibration signal to the head-mounted display, so that when the at least two handles maintain the target relative position, the head-mounted display calibrates a current relative displaying position of the at least two handles in the head-mounted display to a target relative displaying position corresponding to the target relative position.

In this embodiment, the virtual reality (VR) system mainly comprises a head mounted display (HMD) and handles. It can be understood that the handles and the head-mounted display can be communicatively connected.

It should be noted that the method of this embodiment is applicable to the case of at least two handles, that is, there are two or more handles, so as to calibrate the error of the relative displaying position among the handles.

The steps will be described in detail below with reference to FIG. 1.

Step S10, generating a calibration signal when the at least two handles maintain a target relative position.

In the specific implementation process, the target relative position refers to the spatial relative positional relationship among the handles, for example, two handles are attached to each other side by side, two handles are attached to each other back to back, etc. In order to facilitate observation and calibration on the display interface, in determining the target relative position, side-by-side is preferably considered since it is easy to observe the relative positional relationship from the front. The calibration signal may be an electrical signal, for example, an electrical signal generated by voltage fluctuations. It may also be other signals, as long as it can trigger the head-mounted display to perform a calibration operation.

As an optional embodiment, the at least two handles comprise a first handle and a second handle, and the target relative position is that the first handle and the second handle are in a state of being side by side;

the step of generating a calibration signal when the at least two handles maintain the target relative position specifically comprises:

generating a calibration signal when the first handle and the second handle keep the state of being side by side.

In a specific implementation process, when the first handle and the second handle keep the state of being side by side, they may or may not be attached to each other, as long as they can be triggered to generate a calibration signal when they are side by side. However, it should be noted that the target relative position needs to be consistent with the relative displaying position of the target after calibration in the head-mounted display, that is, a calibration program needs to be set in advance in the head-mounted, so that it can correct the relative displaying position of the first handle and the second handle according to the target relative position relationship.

As an embodiment, a first trigger circuit is provided in the first handle, and a second trigger circuit is provided in the second handle;

the step of generating a calibration signal when the first handle and the second handle keep the state of being side by side specifically comprises:

generating a calibration signal based on the first trigger circuit and the second trigger circuit when the first handle and the second handle keep the state of being side by side.

It has been stated above that when the first handle and the second handle keep the state of being side by side, they may or may not be attached to each other. In the specific implementation process, whether the first handle and the second handle are attached to each other or not, a calibration signal can be generated through the first trigger circuit and the second trigger circuit.

Specifically, N number of first trigger points connected to the first trigger circuit are provided on the first handle, and N number of second trigger points connected to the second trigger circuit are provided on the second handle, and N is a positive integer;

the step of generating a calibration signal based on the first trigger circuit and the second trigger circuit when the first handle and the second handle keep the state of being side by side comprises:

when the first handle and the second handle keep the state of being side by side, connecting the N number of first trigger points with the N number of second trigger points correspondingly to trigger the first trigger circuit and the second trigger circuit and generate the calibration signal.

In a specific implementation process, whether the first handle and the second handle are attached to each other or not, the N number of first trigger points and the N number of second trigger points can be connected correspondingly. N is a positive integer, which can be positive integers such as 1, 2, and 3.

Figure 2:
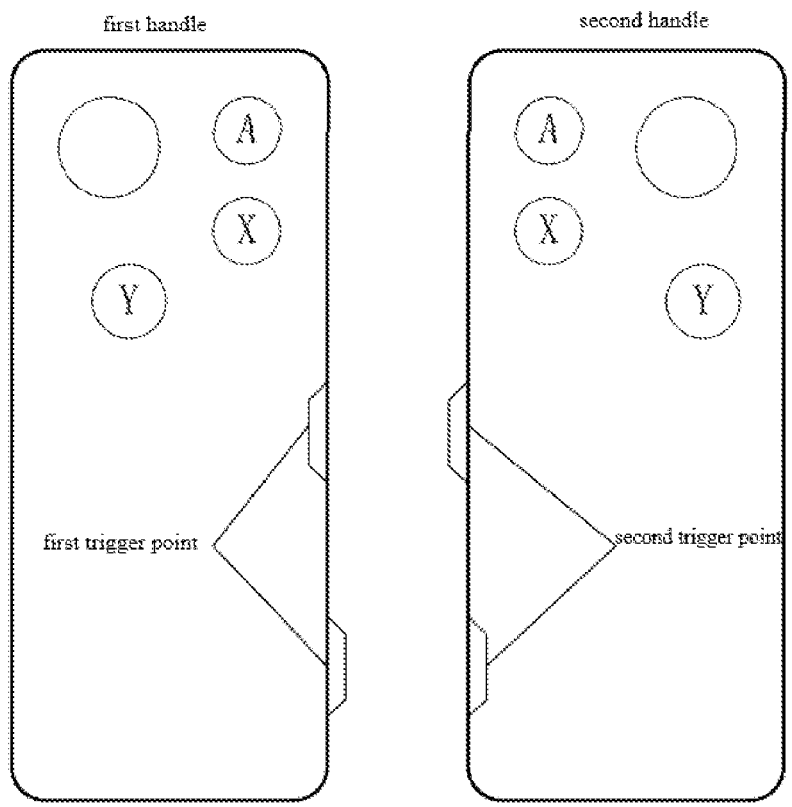
FIG. 2 is a schematic diagram of the structure of two handles in an embodiment of the present disclosure.

Referring to FIG. 2, it shows a schematic diagram of two handles belonging to the same virtual display system, i.e., a first handle and a second handle. N=2, that is, there are two first trigger points and two second trigger points.

Further, the first trigger circuit comprises a first processor electrically connected to two first trigger points, and one of the two first trigger points is set to high level, and the other of the two first trigger points is set to low level;

the second trigger circuit comprises a second processor electrically connected to two second trigger points, and one of the two second trigger points that is corresponding to the first trigger point set to high level is set to low level, and the other of the two second trigger points is set to high level;

the step of when the first handle and the second handle keep the state of being side by side, connecting the N first trigger points with the N number of second trigger points correspondingly to trigger the first trigger circuit and the second trigger circuit and generate the calibration signal specifically comprises:

when the first handle and the second handle keep the state of being side by side, connecting the first trigger point set to high level with the second trigger point set to low level, and connecting the first trigger point set to low level with the second trigger point set to high level, so that both the first processor and the second processor receive electrical signals and generate the calibration signal according to the electrical signal.

In a specific implementation process, both the first processor and the second processor may be MCU processors.

Figure 3:
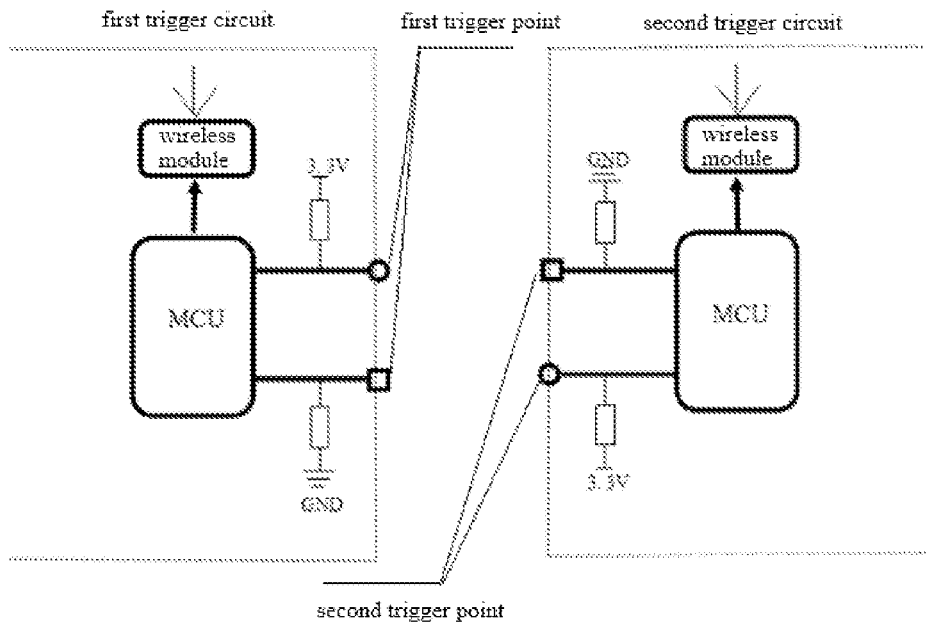
FIG. 3 is a schematic diagram of the structure of circuits in the two handles in FIG. 2.

Please refer to FIG. 3, two first trigger points (or second trigger points) are respectively connected to two GPIO ports on the MCU processor inside the handle. In normal operating state, the voltage level of the two first trigger points (or second trigger points) are respectively 0V (GND ground, network low level) and 3.3V (network high level).

Further, the first trigger point set to high level is a first concave structure, and the second trigger point set to low level is a second convex structure engaged with the first concave structure;

the second trigger point set to high level is a second concave structure, and the first trigger point set to low level is a first convex structure engaged with the second concave structure;

wherein, when the first handle and the second handle keep the state of being side by side, the first convex structure is embedded in the second concave structure, and the second convex structure is embedded in the first concave structure, so that the first trigger point set to high level is connected to the second trigger point set to low level, and the first trigger point set to low level is connected to the second trigger point set to high level.

In a specific implementation process, the connection between the first trigger point and the second trigger point may be in the form of pogo pins, plug-in, magnetic attraction, and the like.

In an embodiment, when the first handle and the second handle keep the state of being side by side and are attached to each other, the first convex structure is embedded in the second concave structure, and the second convex structure is embedded in the first concave structure. The engagement of the concave and convex structures can enable the user to conveniently place the first handle and the second handle in the state of target relative position.

Please refer to FIG. 2, the first trigger point (or second trigger point) connected to the 3.3V network is embedded in the handle, i.e., it is the first concave structure or the second concave structure, and will not contact external metal or human hands, thereby ensuring safety. The first trigger point (or the second trigger point) connected to the GND grounding network protrudes from the surface of the handle, i.e., it is the first protruding structure or the second protruding structure.

In the specific implementation process, when the user places the two handles side by side, the first convex structure is embedded in the second concave structure, and the second convex structure is embedded in the first concave structure, so that the first trigger point set to high level is connected to the second trigger point set to low level, and the first trigger point set to low level is connected to the second trigger point set to high level. The first trigger point of the first handle that is connected to the 3.3V high level will contact the second trigger point of the second handle that is connected to the GND. At this moment, the 3.3V high level of the first handle will be lowered to 0V, and the MCU processor in the first handle will obtain a calibration signal. Similarly, the second trigger point of the second handle that is connected to the 3.3V high level will also contact the first trigger point of the first handle that is connected to GND. The 3.3V high level of the second handle will be lowered to 0V, and the MCU processor in the second handle will recognize the change of the second trigger point of the second handle that is connected to the 3.3V high level. After the triggering of the first handle and the second handle are respectively completed, the trigger information is sent to the HMD device through a wireless module.

In addition, as an embodiment, a small magnet is built into the first handle and the second handle near the first trigger point or the second trigger point. When the two handles are to be calibrated, the two handles are actively and manually moved toward each other. The left and right handles are automatically attached to each other due to the magnetic force of the magnet, and four trigger points of the two handles are connected in pairs to complete the physical triggering connection.

Step S20, sending the calibration signal to the head-mounted display, so that when the at least two handles maintain the target relative position, the head-mounted display calibrates a current relative displaying position of the at least two handles in the head-mounted display to a target relative displaying position corresponding to the target relative position.

In the specific implementation process, during the normal turning-on and use of the handles, the HMD (head-mounted display) will display the current positions of the two handles on the display interface. When the two handles are put side by side and attached together by the user, four trigger points of the two handles contact in pairs, and a calibration signal is generated at this moment.

After the calibration signal is generated by step S10, it is sent to the HMD device through the wireless module. After the calibration signal is received by the HMD, the algorithm is used to perform adjustment. The position of one of the handles is keep unchanged as a reference, the other handle is adjusted so that the positions of the two handles in the HMD display interface are placed side by side to eliminate the offset error of the relative displaying position and achieve the object of calibrating handle position.

It should be noted that during the calibration process, the two handles need to be kept at the target relative position to ensure the accuracy of the calibration.

It should be understood that the above is only for illustration, and does not constitute any limitation to the technical solution of the present disclosure. Those skilled in the art may set based on needs in practical applications, on which there is no limitation herein.

It is not difficult to find out from the above description that, the handle calibration method according to this embodiment calibrates the relative displaying position among the handles in the display interface of the head-mounted display by using the real target relative position maintained among the handles. Compare with the prior art in which the calibration is performed with respect to a single handle by using methods such as optical positioning or electromagnetic positioning, it can solve the technical problem that the conventional handle calibration methods cannot accurately calibrate the relative displaying position among the handles, thereby achieving the technical effect of improving the accuracy of the relative displaying position among the handles.

Second Embodiment

Figure 4:
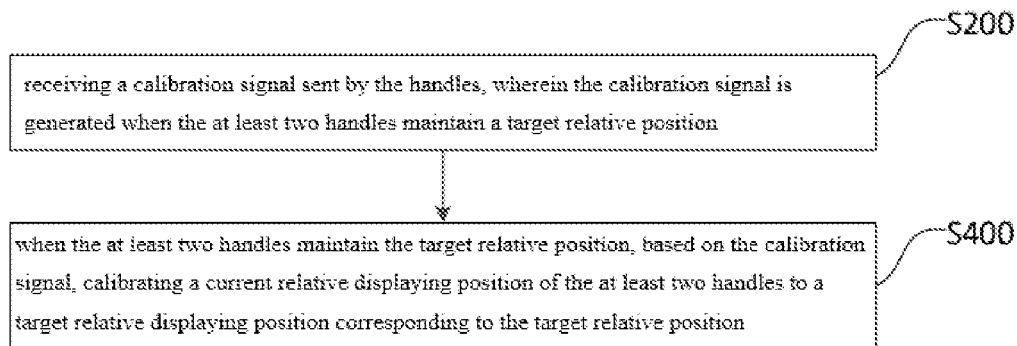
FIG. 4 is a schematic flow chart of another handle calibration method in an embodiment of the present disclosure.

Referring to FIG. 4, an embodiment of the present disclosure also provides a handle calibration method, the method is applied to a head-mounted display in a virtual reality system, the virtual reality system also comprises at least two handles, and the method comprises:

S200, receiving a calibration signal sent by the handles, wherein the calibration signal is generated when the at least two handles maintain a target relative position; and S400, when the at least two handles maintain the target relative position, based on the calibration signal, calibrating a current relative displaying position of the at least two handles to a target relative displaying position corresponding to the target relative position.

In the specific implementation process, the steps of the handle calibration method in this embodiment are the execution process of the steps of the handle calibration method in the aforementioned embodiment at the end of the head-mounted display. Therefore, the principle of the steps and the principle of invention are the same as the foregoing embodiment, and the specific implementations thereof may refer to the foregoing embodiments and will not be repeated here.

It should be understood that the above is only for illustration, and does not constitute any limitation to the technical solution of the present disclosure. Those skilled in the art may set based on needs in practical applications, on which there is no limitation herein.

It is not difficult to find out from the above description that the handle calibration method according to this embodiment calibrates the relative displaying position among the handles in the display interface of the head-mounted display by using the real target relative position maintained among the handles. Compare with the prior art in which the calibration is performed with respect to a single handle by using methods such as optical positioning or electromagnetic positioning, it can solve the technical problem that the conventional handle calibration methods cannot accurately calibrate the relative displaying position among the handles, thereby achieving the technical effect of improving the accuracy of the relative displaying position among the handles.

Figure 5:
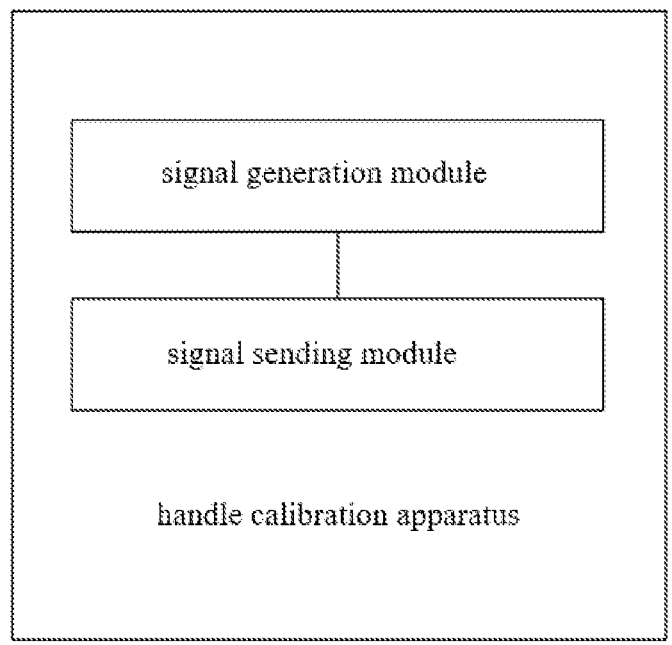
FIG. 5 is a schematic diagram of the structure of a handle calibration apparatus in an embodiment of the present disclosure.

Referring to FIG. 5, based on the same inventive concept as the first embodiment, an embodiment of the present disclosure also provides a handle calibration apparatus, which is applied to at least two handles belonging to a same virtual reality system, the virtual reality system also comprises a head-mounted display, and the apparatus comprises:

a signal generation module for generating a calibration signal when the at least two handles maintain a target relative position; and a signal sending module for sending the calibration signal to the head-mounted display, so that when the at least two handles maintain the target relative position, the head-mounted display calibrates a current relative displaying position of the at least two handles in the head-mounted display to a target relative displaying position corresponding to the target relative position.

It should be understood that the above is only for illustration, and does not constitute any limitation to the technical solution of the present disclosure. Those skilled in the art may set based on needs in practical applications, on which there is no limitation herein.

It is not difficult to find out from the above description that, the handle calibration apparatus according to this embodiment calibrates the relative displaying position among the handles in the display interface of the head-mounted display by using the real target relative position maintained among the handles. Compare with the prior art in which the calibration is performed with respect to a single handle by using methods such as optical positioning or electromagnetic positioning, it can solve the technical problem that the conventional handle calibration methods cannot accurately calibrate the relative displaying position among the handles, thereby achieving the technical effect of improving the accuracy of the relative displaying position among the handles.

Figure 6:
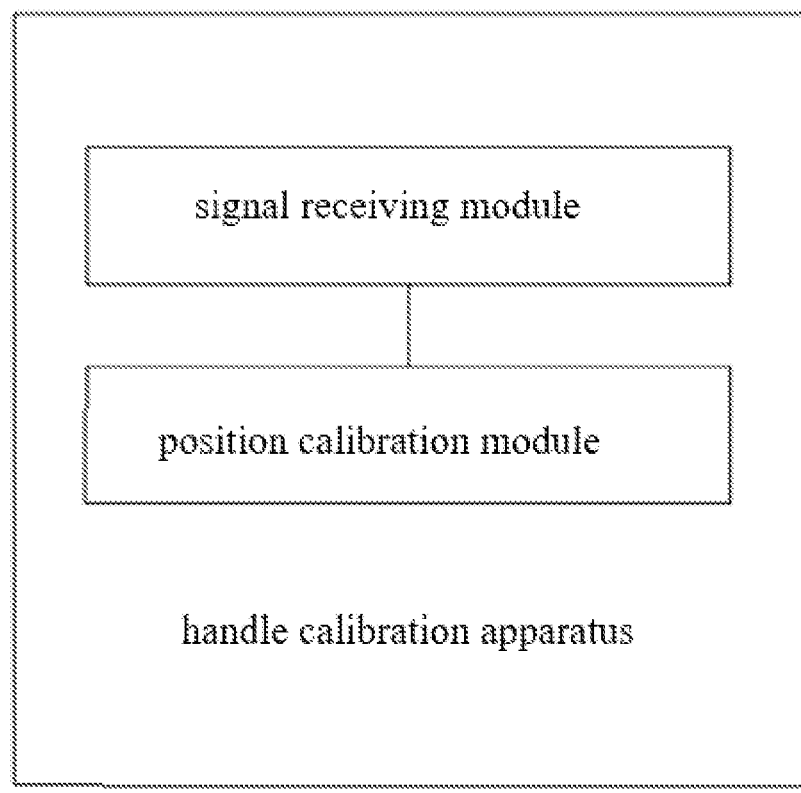
FIG. 6 is a schematic diagram of the structure of another handle calibration apparatus in an embodiment of the present disclosure.

Referring to FIG. 6, based on the same inventive concept as the second embodiment, an embodiment of the present disclosure also provides a handle calibration apparatus for at least two handles belonging to a same virtual reality system, the virtual reality system also comprises a head-mounted display, and the apparatus comprises:

a signal receiving module for receiving a calibration signal sent by the handles, wherein the calibration signal is generated when the at least two handles maintain a target relative position; and a position calibration module for, when the at least two handles maintain the target relative position, based on the calibration signal, calibrating a current relative displaying position of the at least two handles to a target relative displaying position corresponding to the target relative position.

An embodiment of the present disclosure also proposes a handle comprising: a memory, a processor, and a computer program that is stored on the memory, operable on the processor, and configured to implement the steps of the method of the first embodiment.

An embodiment of the present disclosure also proposes a head-mounted display comprising: a memory, a processor, and a computer program that is stored on the memory, operable on the processor, and configured to implement the steps of the method of the second embodiment.

In addition, an embodiment of the present disclosure also proposes a virtual reality system comprising the handle and the head-mounted display of the above embodiments.

In addition, an embodiment of the present disclosure also provide a storage medium having a computer program stored thereon, and when the computer program is executed by a processor, the steps of the method of the first or second embodiment are implemented.

It should be noted that, the terms "comprise", "include" or any other variants used herein are intended to cover non-exclusive inclusion, so that the process, method, article or apparatus including a series of elements may not only include those elements, but may also include other elements not stated explicitly, or elements inherent to the process, method, articles or apparatus. Without more limitations, an element defined by the phrase "comprising a . . . " does not exclude the case that there are other same elements in the process, method, article or apparatus including the element.

The above serial numbers of the embodiments of the present disclosure are only for description and do not represent the priority order of the embodiments.

Through the above description of the embodiments, those skilled in the art can clearly understand that the methods of the embodiments can be implemented by means of software plus the necessary general hardware platform. Of course, it can also be implemented by hardware, but in many cases, the former is the better implementation method. Based on this understanding, the technical solution of the present disclosure, in essence or the part that contributes to the prior art, can be embodied in the form of a software product, which is stored on the above storage medium (such as ROM/RAM, magnetic disc, optical disc), and includes instructions to enable a mobile terminal to execute the method of each embodiment of the present disclosure.

The above only describes the preferred embodiments of the present disclosure, and is not intended to limit the scope of the patent of the present disclosure. All equivalent substitutions of structure or process made by using the contents of the description and drawings of the present disclosure, or direct or indirect applications in other related technical fields, shall all fall within the scope of protection scope of the present disclosure.

The following detailed description is merely exemplary in nature and is not intended to limit the invention or the application and uses of the invention. Furthermore, there is no intention to be bound by any theory presented in the preceding background of the invention or the following detailed description.

What is claimed is:

1. A handle calibration method, wherein it is applied to at least two handles belonging to a same virtual reality system, the virtual reality system also comprises a head-mounted display, and the method comprises the steps of:
generating a calibration signal when the at least two handles maintain a target relative position; and
sending the calibration signal to the head-mounted display, so that when the at least two handles maintain the target relative position, the head-mounted display calibrates a current relative displaying position of the at least two handles in the head-mounted display to a target relative displaying position corresponding to the target relative position.

2. The handle calibration method according to claim 1, wherein the at least two handles comprise a first handle and a second handle, and the target relative position is that the first handle and the second handle are in a state of being side by side;
the step of generating a calibration signal when the at least two handles maintain the target relative position specifically comprises:
generating a calibration signal when the first handle and the second handle keep the state of being side by side.

3. The handle calibration method according to claim 2, wherein a first trigger circuit is provided in the first handle, and a second trigger circuit is provided in the second handle;
the step of generating a calibration signal when the first handle and the second handle keep the state of being side by side specifically comprises:
generating a calibration signal based on the first trigger circuit and the second trigger circuit when the first handle and the second handle keep the state of being side by side.

4. The handle calibration method according to claim 3, wherein N number of first trigger points connected to the first trigger circuit are provided on the first handle, and N number of second trigger points connected to the second trigger circuit are provided on the second handle, and N is a positive integer;
the step of generating a calibration signal based on the first trigger circuit and the second trigger circuit when the first handle and the second handle keep the state of being side by side comprises:
when the first handle and the second handle keep the state of being side by side, connecting the N number of first trigger points with the N number of second trigger points correspondingly to trigger the first trigger circuit and the second trigger circuit and generate the calibration signal.

5. The handle calibration method according to claim 4, wherein the first trigger circuit comprises a first processor electrically connected to two first trigger points, and one of the two first trigger points is set to high level, and the other of the two first trigger points is set to low level;
the second trigger circuit comprises a second processor electrically connected to two second trigger points, and one of the two second trigger points that is corresponding to the first trigger point set to high level is set to low level, and the other of the two second trigger points is set to high level;
the step of when the first handle and the second handle keep the state of being side by side, connecting the N number of first trigger points with the N number of second trigger points correspondingly to trigger the first trigger circuit and the second trigger circuit and generate the calibration signal specifically comprises:
when the first handle and the second handle keep the state of being side by side, connecting the first trigger point set to high level with the second trigger point set to low level, and connecting the first trigger point set to low level with the second trigger point set to high level, so that both the first processor and the second processor receive electrical signals and generate the calibration signal according to the electrical signal.

6. The handle calibration method according to claim 5, wherein the first trigger point set to high level is a first concave structure, and the second trigger point set to low level is a second convex structure engaged with the first concave structure;

the second trigger point set to high level is a second concave structure, and the first trigger point set to low level is a first convex structure engaged with the second concave structure;

wherein, when the first handle and the second handle keep the state of being side by side, the first convex structure is embedded in the second concave structure, and the second convex structure is embedded in the first concave structure, so that the first trigger point set to high level is connected to the second trigger point set to low level, and the first trigger point set to low level is connected to the second trigger point set to high level.

7. A handle, comprising: a memory, a processor, and a computer program that is stored on the memory, operable on the processor, and configured to implement the steps of the method according to claim 6.

8. A handle, comprising: a memory, a processor, and a computer program that is stored on the memory, operable on the processor, and configured to implement the steps of the method according to claim 2.

9. A handle, comprising: a memory, a processor, and a computer program that is stored on the memory, operable on the processor, and configured to implement the steps of the method according to claim 3.

10. A handle, comprising: a memory, a processor, and a computer program that is stored on the memory, operable on the processor, and configured to implement the steps of the method according to claim 4.

11. A handle, comprising: a memory, a processor, and a computer program that is stored on the memory, operable on the processor, and configured to implement the steps of the method according to claim 5.

12. A handle, comprising: a memory, a processor, and a computer program that is stored on the memory, operable on the processor, and configured to implement the steps of the method according to claim 1.

13. A handle calibration method, wherein it is applied to a head-mounted display in a virtual reality system, the virtual reality system also comprises at least two handles, and the method comprises:

receiving a calibration signal sent by the handles, wherein the calibration signal is generated when the at least two handles maintain a target relative position; and when the at least two handles maintain the target relative position, based on the calibration signal, calibrating a current relative displaying position of the at least two handles to a target relative displaying position corresponding to the target relative position.

14. A head-mounted display, comprising: a memory, a processor, and a computer program that is stored on the memory, operable on the processor, and configured to implement the steps of the method according to claim 13.

15. A handle calibration apparatus, wherein it is applied to at least two handles belonging to a same virtual reality system, the virtual reality system also comprises a head-mounted display, and the apparatus comprises:

a signal generation module for generating a calibration signal when the at least two handles maintain a target relative position; and a signal sending module for sending the calibration signal to the head-mounted display, so that when the at least two handles maintain the target relative position, the head-mounted display calibrates a current relative displaying position of the at least two handles in the head-mounted display to a target relative displaying position corresponding to the target relative position.

\* \* \* \* \*